United States Patent
Flehmig et al.

(10) Patent No.: US 8,296,922 B2
(45) Date of Patent: Oct. 30, 2012

(54) METHOD FOR PRODUCING LOW-SPRINGBACK HALF SHELLS

(75) Inventors: Thomas Flehmig, Ratingen (DE); Lothar Hömig, Voerde (DE); Konstantinos Savvas, Mülheim an der Ruhr (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 738 days.

(21) Appl. No.: 12/297,395

(22) PCT Filed: Apr. 23, 2007

(86) PCT No.: PCT/EP2007/053933
§ 371 (c)(1),
(2), (4) Date: Feb. 11, 2009

(87) PCT Pub. No.: WO2007/125051
PCT Pub. Date: Nov. 8, 2007

(65) Prior Publication Data
US 2009/0305075 A1   Dec. 10, 2009

(30) Foreign Application Priority Data
Apr. 26, 2006 (DE) .......................... 10 2006 020 000
Apr. 26, 2007 (WO) .............................. 2007/124781

(51) Int. Cl.
*B21D 39/02* (2006.01)
*B21D 28/00* (2006.01)
*B21D 22/20* (2006.01)
*B23P 11/00* (2006.01)

(52) U.S. Cl. ........... 29/463; 29/525.14; 72/334; 72/347; 72/348; 72/379.2; 72/381; 72/386

(58) Field of Classification Search .................. 29/424, 29/463, 525.14; 72/347, 348, 349, 381, 383, 72/384, 386, 379.2, 702, 334, 340
See application file for complete search history.

(56) References Cited

U.S. PATENT DOCUMENTS
1,310,130 A * 7/1919 Murray, Jr. ..................... 29/463
(Continued)

FOREIGN PATENT DOCUMENTS
DE   3218923   12/1982
(Continued)

OTHER PUBLICATIONS
International Search Report for International Application No. PCT/EP2007/053933.

*Primary Examiner* — Jermie Cozart
(74) *Attorney, Agent, or Firm* — Reinhart Boerner Van Deuren P.C.

(57) ABSTRACT

A method for producing low-springback half shells made of a metal, in particular steel or a steel alloy, includes drawing in at least one drawing die a blank, such that the blanks have flange regions on the deep drawn body after the deep drawing. The flange regions are shaped by upsetting a corner substantially perpendicularly to a wall of the deep drawn region of the blank and the flange regions are subsequently trimmed in a shearing die, such that half shells without margins are produced.

9 Claims, 4 Drawing Sheets

U.S. PATENT DOCUMENTS

| | | | | |
|---|---|---|---|---|
| 1,715,135 | A | * | 5/1929 | Lambert .......................... 72/294 |
| 1,887,494 | A | * | 11/1932 | Murray, Jr. .................... 228/155 |
| 2,902,753 | A | * | 9/1959 | Schilberg ........................ 29/416 |
| 3,197,996 | A | * | 8/1965 | Zeder, Jr. ........................ 72/348 |
| 4,619,292 | A | * | 10/1986 | Harwood ...................... 138/113 |
| 4,760,755 | A | * | 8/1988 | Peck ........................... 74/606 R |
| 4,921,159 | A | * | 5/1990 | Peck ............................. 228/182 |
| 6,082,166 | A | | 7/2000 | Marin ............................. 72/348 |
| 6,098,262 | A | | 8/2000 | Thoms et al. ................ 29/421.1 |

FOREIGN PATENT DOCUMENTS

| | | |
|---|---|---|
| DE | 38 01 249 | 8/1988 |
| EP | 0906804 | 4/1999 |
| EP | 0919304 | 6/1999 |
| EP | 1593558 | 11/2005 |
| JP | 60137527 | 7/1985 |
| JP | 08-168830 | 7/1996 |
| JP | 08168830 | 7/1996 |

* cited by examiner

US 8,296,922 B2

METHOD FOR PRODUCING LOW-SPRINGBACK HALF SHELLS

CROSS-REFERENCE TO RELATED APPLICATIONS

This application is a National Phase Application of International Application No. PCT/EP2007/053933, filed on Apr. 23, 2007, which claims the benefit of and priority to German patent application no. DE 10 2006 020 000.4-14, filed Apr. 26, 2006. The disclosure of the above applications are incorporated herein by reference in their entirety.

FIELD OF THE INVENTION

The invention relates to a method for producing low-springback half shells made of a metal, in particular steel or a steel alloy, in which blanks are drawn in at least one drawing die, such that the blanks have flange regions on the deep drawn body after the deep drawing and also to a device for producing low-springback half shells. In addition, the invention relates to a method for producing closed hollow profiles, in particular modular tubes, in which method at least two half shells are positioned in such a way that the edges each form a butt joint and the half shells are welded to one another along the edges, in particular using a laser beam, and also to a closed hollow profile which is produced from the half shells according to the invention and is made of a metal, in particular of steel or a steel alloy.

BACKGROUND

In motor vehicles, use is increasingly being made of closed hollow profiles having cross sections and material thicknesses adapted specifically to the case of application. In the past, closed hollow profiles have generally been produced first by shaping a tube, subjecting the tube to appropriate bending or pre-deformation and subsequently carrying out hydroforming of the pre-bent or pre-deformed shape to form the final shape of the closed hollow profile. On the one hand, not all components can be produced in this way, as during the hydroforming local extensions of the material are exceeded, so that cracks can form. In addition, uncontrollable wrinkling can occur during the hydroforming. On the other hand, the previously used method steps for producing a closed hollow profile which is adapted to the application in question are very complex and thus cost-intensive. Although a closed hollow profile can in principle also be produced from two deep drawn half shells, stresses are introduced into the blank during deep drawing of a blank and can lead to springback of the blank. However, the springback of the half shells hinders precise positioning of the half shells in a die for welding. In the past, welding of the edges of the half shells in a butt joint was not possible without great expense owing to the springback of the half shells. For this reason, closed hollow profiles consisting of welded half shells have in the past conventionally been welded to the protruding flange regions. However, the protruding weld seam prevents these closed hollow profiles from being inserted like closed hollow profiles which are produced from a welded tube and have no protruding weld seam. Also, the flanges significantly increase the total weight of the component.

A method for producing half shells is known from published Japanese patent application JP 08/168830, in which method a blank is first deep drawn in a die, such that protruding flange regions are produced. The flange regions are subsequently upset and sheared off at the same time via an upper cutting and upsetting swage. However, owing to the geometry of the upper cutting/upsetting swage, the half shells thus obtained display non-uniformities at the edges of the half shells, so that said half shells are not suitable for welding in a butt joint. In addition, the known cutting/upsetting does not lead to sufficiently low-stress half shells which are suitable for being welded to one another in a butt joint.

SUMMARY OF THE INVENTION

In one aspect, the present invention provides a method and a device for producing low-springback half shells made of metal, in particular steel or a steel alloy, allowing the production of low-springback half shells having edge regions suitable for welding in the butt joint. In another aspect, the present invention provides closed hollow profiles produced from half shells according to the invention and also a corresponding production method for closed hollow profiles.

According to a first teaching of the present invention, a method for producing low-springback half shells made of a metal includes shaping the flange regions by upsetting a corner substantially perpendicularly to the wall of the body of the deep drawn blank and subsequently trimming the flange regions in a shearing die, such that half shells without margins are produced.

As a result of the upsetting according to the invention of a corner into the flange regions, so that said flange regions are formed substantially perpendicularly to the wall of the body of the deep drawn blank, on the one hand the stresses introduced into the blank during the deep drawing are first partly equalized. The resulting half shell has low springback laterally to the body wall. On the other hand, after trimming of the flange regions, the surface of the edges of the half shells has a shape which is precisely defined during the upsetting and is predetermined by the upsetting tool for shaping the corners of the flange regions. This results from the fact that the cutting plane can run perpendicularly to the edge surface during the subsequent shearing-off. The resulting half shells therefore not only have low springback but rather also have the precisely defined geometrical edge shape in the axial direction that is desirable for welding in the butt joint. Conventionally, the edges of the half shells are shaped in a planar manner as a plateau to achieve good weldability in the butt joint. It is however also conceivable additionally to impress any other desired cross-sectional profile onto the edges of the half shells during the upsetting.

The springback properties of the half shells are further improved as a result of the fact that during and/or after the trimming of the flange regions, the body and/or the edges of the trimmed half shells are additionally upset. This additional upsetting further reduces any prevailing springback forces.

If, according to a subsequent further embodiment of the method according to the invention, the deep drawing of the blank and the shaping of the flange regions takes place in a single operation in the drawing die, the flange regions being shaped by a blank holder, the number of operations can be reduced to a minimum. For example, in this case, a single blank holder and a single upper deep drawing swage can facilitate deep drawing and corresponding shaping of the flange regions perpendicularly to the wall of the deep drawn region of the blank. It is however also conceivable to carry out the shaping of the flange regions by a further upper drawing swage, thus allowing the individual elements of the drawing die, for example the blank holder, to be configured in a simpler manner.

Preferably, an upsetting component is taken into account in the deep drawing of the blank in the drawing die, so that the actual depth of the body after the deep drawing is greater than required. The upsetting component provided is used to return by upsetting the stresses introduced into the regions during the deep drawing while nevertheless customizing the deep drawn body.

For the same reason, according to another embodiment of the method according to the invention, a reverse curve is introduced into the flange regions prior to the trimming. In particular, this additionally counteracts a springback moment which is introduced into the wall of the body and the flange regions during the deep drawing.

Preferably, the flange regions are trimmed by punching or alternatively using a laser beam. A punching press leads to reduced equipment costs. The use of a laser beam, on the other hand, prevents additional stresses and thus springback moments from being introduced into the half shells as a result of the trimming of the flange regions.

According to a second teaching of the present invention, a method for producing closed hollow profiles includes use of at least two half shells produced in accordance with the invention.

A greater degree of freedom for changes in cross section is obtained during the deep drawing of the half shells than during the conventionally used hydroforming. The different cross-sectional geometries are determined by a correspondingly configured drawing die. In this respect, the aforementioned method is particularly advantageous for producing modular tubes having variable cross-sectional shapes in the longitudinal direction. Owing to the paucity of springback, in particular laterally to the body wall, of the half shells produced in accordance with the invention, said half shells can readily be positioned in such a way that the edges each form an exact butt joint, as the half shells display very high dimensional precision owing to the paucity of springback. Preferably, a laser beam is used for welding the edges. Nevertheless, it is also conceivable to use conventional welding methods.

With regard to economical production of closed hollow profiles, the method according to the invention can be further improved as a result of the fact that at least two shearing dies are used to produce the half shells, the half shells are subsequently inserted into two contour dies and the two half shells are positioned relative to each other by a form fit of the two contour dies with each other using a suitable device. With the aid of two simple contour dies configured merely for receiving the half shells in a precisely defined position, the low-springback half shells can easily be positioned relative to each other with such precision that said half shells form a readily weldable butt joint. The form fit of the two contour dies with each other allows the positioning to be carried out in a reproducible manner, thus allowing procedural safety to be increased during the welding. Nevertheless, in addition to a form fit, other methods can alternatively also be used for precisely positioning the dies receiving the half shells. In addition, the contour dies can be replaced by even simpler positioning means, for example positioning pins, provided that the half shells can be produced almost without springback laterally to the body wall.

According to a further embodiment of the method according to the invention for producing closed hollow profiles, prior to the welding of the half shells there is inserted between the positioned half shells a resilient hose which is subjected to pressure via a pressure medium and remains between the half shells during the welding. Any remaining springback forces are counteracted by the use of the resilient hose, thus allowing, for example in conjunction with the contour dies which are used and in which the half shells are positioned for welding, the positional precision of the edges relative to one another again to be improved. Both liquid and gaseous media are suitable as pressure media in the hose.

Preferably, the resilient hose is thermally protected, in particular in the region of the weld seams. For example, a ceramic tape arranged in the region of the weld seams can protect the resilient hose from the temperature effect of the welding beams. It is however also conceivable to design the resilient hose directly with corresponding thermal protection.

According to a third teaching of the present invention, a closed hollow profile made of a metal, in particular of steel or a steel alloy, includes at least two low-springback half shells produced using the method according to the invention, the edges of which are welded to one another in the longitudinal direction via a butt joint. The closed hollow profiles can not only be produced particularly economically but also display high flexibility with regard to their shaping, thus allowing them to be used for example in the field of vehicle construction. In addition, they display much lower stresses than the closed hollow profiles previously produced from deep drawn half shells and having flanges, as low-springback half shells are used for production.

As stated hereinbefore, the half shells produced using the method according to the invention can be produced particularly easily via appropriate upper swage geometries of the drawing die, so that the closed hollow profile is preferably a modular tube.

Finally, according to a fourth teaching of the present invention, a device for producing half shells of a closed hollow profile includes a drawing die and a shearing die, the drawing die having at least a first upper swage and a first blank holder for drawing the blank and also for producing a flange region. The device also includes at least one further upper swage and (in some embodiments) a further blank holder. The further upper swage and further blank holder are provided for upsetting a corner in and for shaping the flange regions of the blank substantially perpendicularly to the wall of the body of the deep drawn blank.

As described hereinbefore, the device according to the invention can be used to produce half shells which on the one hand have low springback and have a precisely defined surface at the axial edges of the half shells. The device according to the invention is therefore suitable for producing, in a simple manner, flangeless half shells for producing closed hollow profiles.

If a first blank holder of the drawing die is provided, with which a corner can be upset into the flange regions of the blank and the flange regions can be shaped substantially perpendicularly to the wall of the body of the deep drawn blank, it is possible to produce half shells according to the invention in a two-stage process using the device according to the invention, as no additional upper swage has to be used for upsetting and shaping the flange regions.

If the shearing die of the device has an upper shearing swage for shearing off the flange regions which are shaped and an upper upsetting swage for upsetting the body and/or the edges of the half shell, a particularly simple upper shearing swage and a particularly simple upper upsetting swage can be used for carrying out the shearing and upsetting operations.

If the upper shearing swage of the shearing die is at the same time configured as an upper upsetting swage for the body and/or the edges of the half shell, it is for example possible to introduce into the flange region during the shearing-off reverse curves which make the shearing-off and the upsetting of the edge procedurally safer during the trimming of the half shell. In addition, the reverse curve reduces springback moments in the body that were caused by the deep drawing process.

A device according to the invention allows the cost-effectiveness with regard to the production of closed hollow profiles to be further improved as a result of the fact that two drawing dies, two shearing dies and two contour dies are provided. A corresponding device allows the blanks to be drawn, sheared off accordingly and welded to one another at the same time.

DESCRIPTION OF THE DRAWINGS

There are therefore a large number of possibilities for developing and configuring the method and device according to the invention for producing half shells made of metal and also the method according to the invention for producing closed hollow profiles, as well as the closed hollow profiles themselves. In this regard, reference is made on the one hand to the claims and on the other hand to the description of four exemplary embodiments in conjunction with the drawings, in which:

DESCRIPTION

Figure 1:
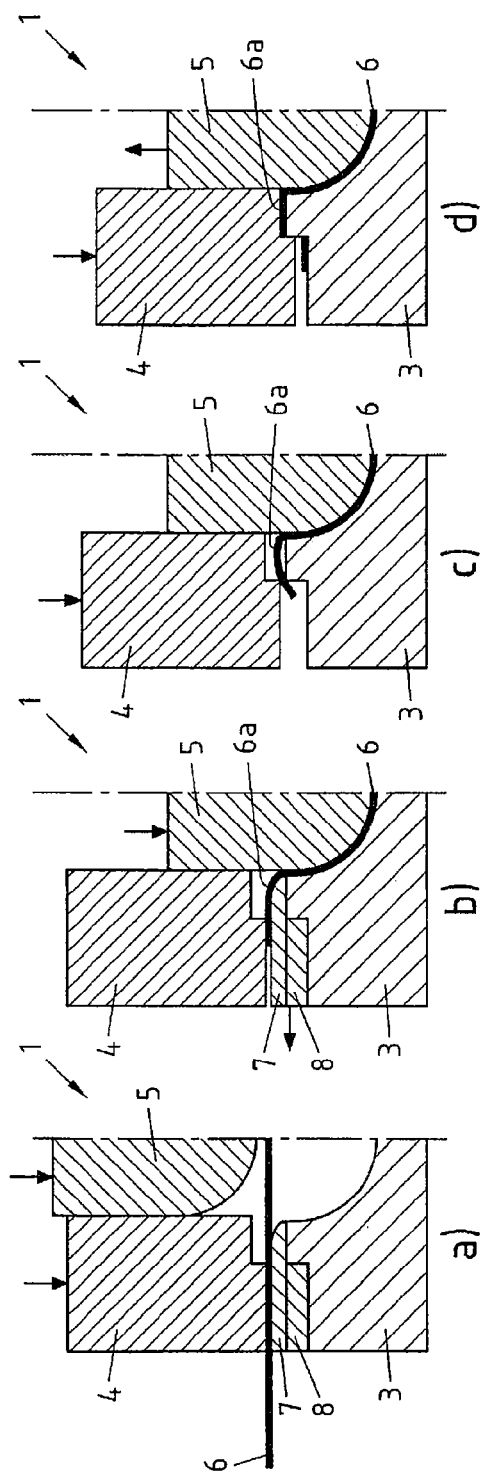
FIG. 1 is a schematic sectional view of the drawing and the shearing dies, respectively, during the carrying-out of an exemplary embodiment of the method according to the invention for producing low-springback half shells.
Figure 1:
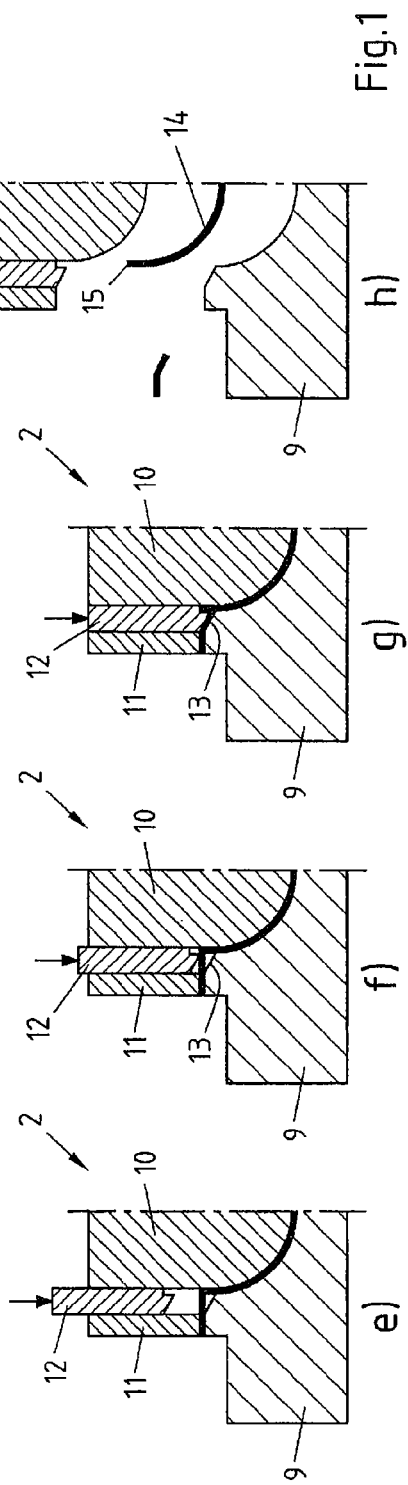

FIG. 1a) to 1h) are schematic radial sectional views of one half of a drawing die 1 and a shearing die 2 at different points in time during the carrying-out of an exemplary embodiment of the method according to the invention. The drawing die 1 comprises a bottom swage 3, a blank holder 4 and an upper swage 5 for drawing the blank 6. The blank 6 is first inserted into the drawing die 1 and fixed via the blank holder 4 and spacers 7, 8, as FIG. 1a) shows. FIG. 1b) then shows how the upper swage 5 draws the blank 6, producing corresponding flange regions 6a. The upper swage 5 extends in this case in the longitudinal direction to produce a half shell for a hollow profile, for example having a cross-sectional shape which varies in the longitudinal direction. In the operation shown in FIG. 1c), the blank holder 4 is lowered further, once the spacers 7, 8 have been removed from the drawing die, so that on the one hand the flange region 6a is trimmed via a cutting edge which is present on the blank holder 4. On the other hand, the further movement of the blank holder 4 into the flange region 6a shapes a corner by upsetting. The shaping of the corner into the flange region 6a ensures that the surface of the edge of the half shell is shaped in accordance with the shape of the blank holder 4 and obtains a precisely defined contour. In the present exemplary embodiment, the surface of the axially extending edge of the half shell is brought by the blank holder 4 into a planar shape perpendicularly to the wall of the body of the deep drawn blank. At the same time, the upsetting of the walls of the body of the deep drawn blank equalises the stresses which are introduced into the blank during the deep drawing, so that there are almost no restoring moments in the deep drawn half shell. The upsetting according to the invention can therefore be used to produce low-springback half shells. FIG. 1d) shows the exemplary embodiment of the method according to the invention at the end of the operations in the drawing die after the upsetting of the flange region 6a. In this position, the blank holder 4 and the upper swage 5 can then be drawn and the blank 6 removed from the drawing die with a flange region 6a shaped substantially perpendicularly to the wall.

FIG. 1e) to 1h) show the further course of the first exemplary embodiment of the method according to the invention in a shearing die 2. The shearing die 2 comprises a bottom swage 9, two blank holders 10, 11 and an upper upsetting/cutting swage 12. Once the blank has been inserted into the shearing die 2, the blank is fixed in its position by the blank holders 10, 11, as FIG. 1e) shows. The bottom swage 9 comprises a cavity 13 which is adapted to the upper cutting/upsetting swage 12 and into which the flange region 6a is shaped during the trimming of the deep drawn blank. In this case, the upper cutting/upsetting swage 12 shapes into the flange region 6a a reverse curve which is directed in opposition to the curve of the flange region after the deep drawing. The reverse curve serves on the one hand to facilitate the separating-off of the flange region. On the other hand, the reverse curve of the flange region and the upsetting process of the upper cutting/upsetting swage 12 provide a further reduction in stress in the trimmed half shell. Once, as FIG. 2g) shows, the upper cutting and upsetting swage 12 has deformed the flange region into the mould cavity 13, the shearing die can be opened and a half shell 14 without margins removed in accordance with FIG. 1h). The half shell 14 without margins has, owing to the additional upsetting steps, almost no springback forces which are conventionally introduced into deep drawn parts via the deep drawing. Owing to the precisely defined geometry of the surface of the edge 15 of the half shell, said half shell is ideally suited to be welded to an appropriate other half shell to form a closed hollow profile.

Figure 2:
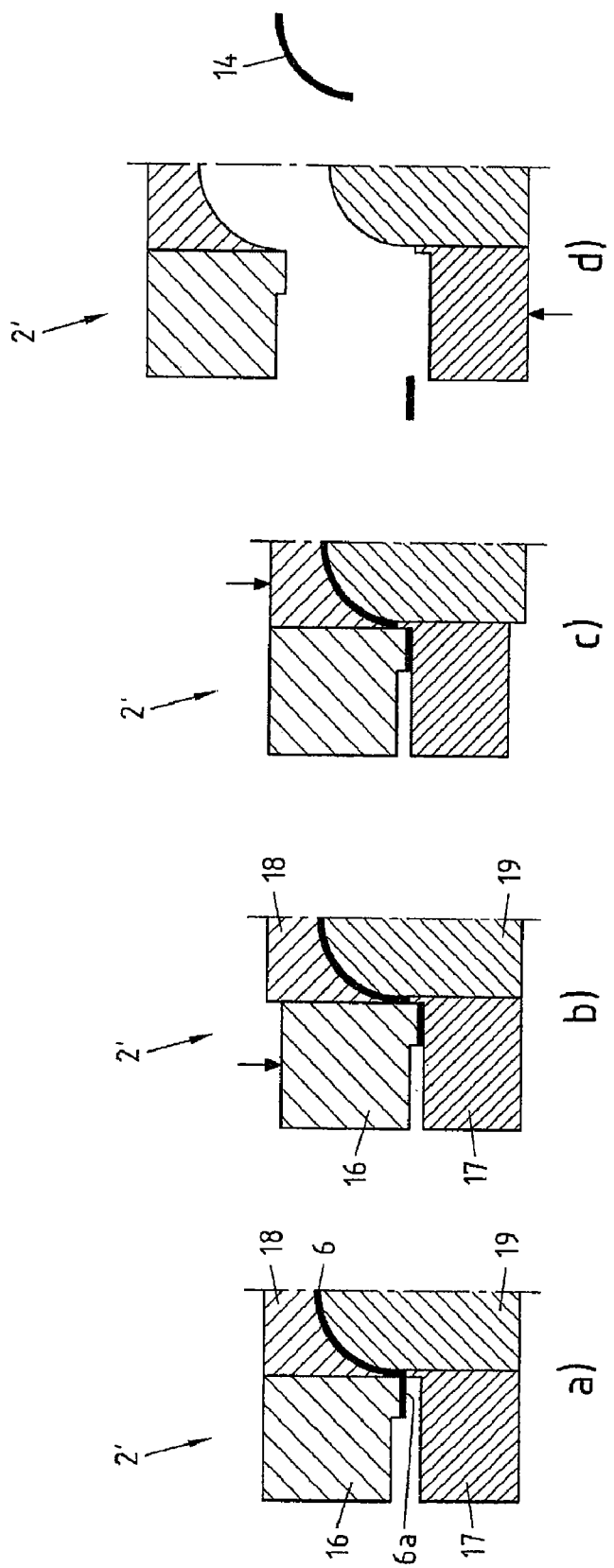
FIG. 2 is a schematic sectional view of an alternative shearing die during the carrying-out of the exemplary embodiment from FIG. 1.

FIG. 2a) to 2d) are schematic radial sectional views of an alternative embodiment of the shearing die during the carrying-out of a further exemplary embodiment of the method according to the invention. The shearing die 2' has a bottom swage 18, an upper cutting swage 16 and a blank holder 17. The upper cutting swage 16 cuts in conjunction with the blank holder 17 the flange region 6a, which is shaped so as to protrude perpendicularly as a corner, of the deep drawn blank, as FIGS. 2a) and 2b) show. After the trimming of the flange region 6a, a relative movement of the bottom swage 18 and of the upper swage 19 with respect to each other in conjunction with the blank holder 17 additionally upsets the wall of the body of the deep drawn blank 6, FIG. 2c). Subsequently, according to FIG. 2d), the shearing die 2' can be opened and the half shell 14 removed. In contrast to the shearing die shown in FIG. 1e) to 1h), the upsetting of the wall of the deep drawn blank 6 and the shearing-off of the flange region 6a from the deep drawn blank 6 are carried out separately from each other, so that additional flexibility is achieved with regard to the process parameters during the shearing-off and upsetting.

Figure 3:
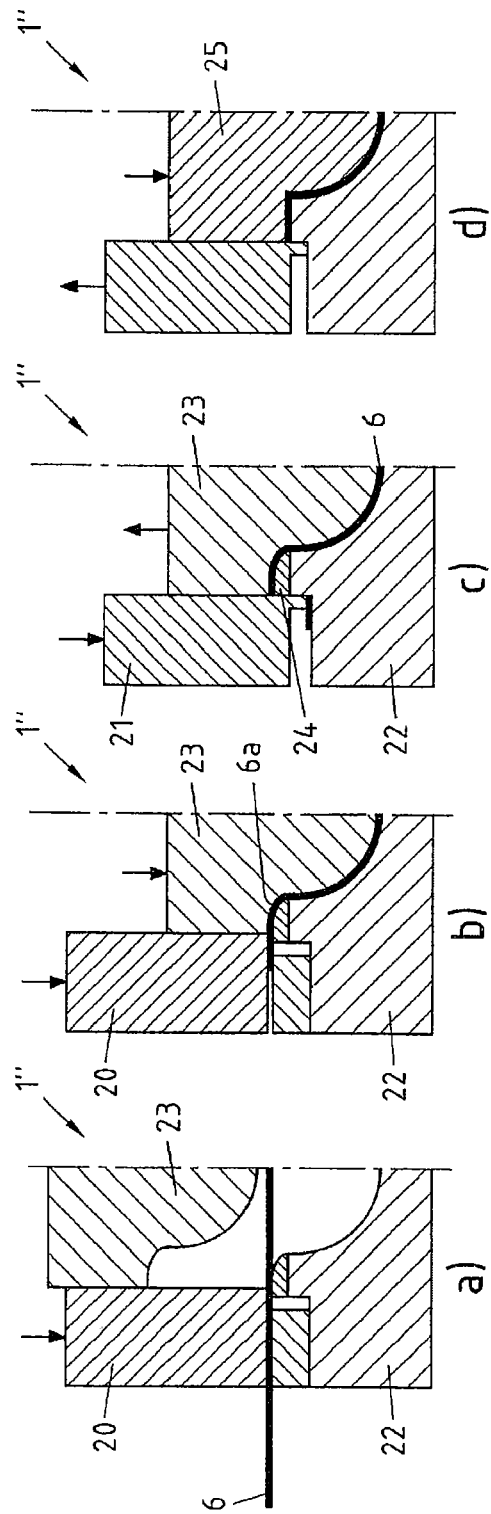
FIG. 3 is a schematic sectional view of the drawing and shearing dies during the carrying-out of a third exemplary embodiment of the method according to the invention for producing low-springback half shells.

FIG. 3a) to f) are schematic sectional views of the drawing die 1" and the shearing die 2" during the carrying-out of a third exemplary embodiment of the method according to the invention. In the third exemplary embodiment of the method according to the invention, the blank 6 is deep drawn and trimmed in a three-stage method. In contrast to the first exemplary embodiment of the method according to the invention, in which the deep drawing and upsetting of the flange regions perpendicularly to the wall of the deep drawn region of the blank are carried out in a single operation, two operations are required in the third exemplary embodiment illustrated in FIG. 3. The simply held blank holder 20 of the drawing die 1″ serves, as may be seen from FIGS. 2a) and 2b), merely to hold the blank 6 during the deep drawing process. After the deep drawing of the blank 6 by the upper drawing swage 23, which dips into the bottom swage 22, the blank holder 20 is removed. An upper cutting swage 21 subsequently trims the edge region of the flange regions 6a of the deep drawn blank, while the upper deep drawing swage 23 functions as a blank holder. Subsequently, the upper deep drawing swage 23 and a spacer 24, which was used beforehand to form a bent flange region 6a of the blank, are removed. The bent flange region 6a allows particularly effective flowing of the material of the blank, thus improving the reshaping behaviour of the blank 6. After the drawing of the spacer 24 and introduction of an additional upper upsetting swage 25, the flange region 6a is upset as a corner perpendicularly to the wall of the body of the deep drawn blank and trimmed in a shearing die 2″ via an upper cutting and upsetting swage 26. The bottom swage 27 comprises, like the drawing die 2 used in the first exemplary embodiment of the method according to the invention, a mould cavity 28 which serves to introduce a reverse bend during the upsetting cut.

Figure 4:
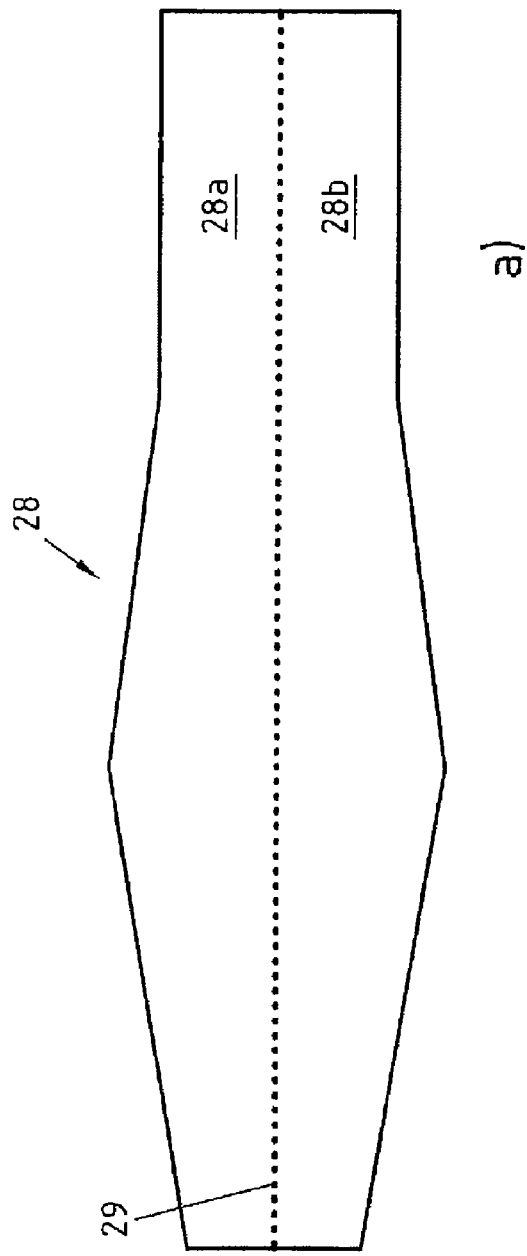
FIG. 4 is an axial sectional view and also a plan view of a fourth exemplary embodiment of a closed hollow profile according to the invention.
Figure 4:
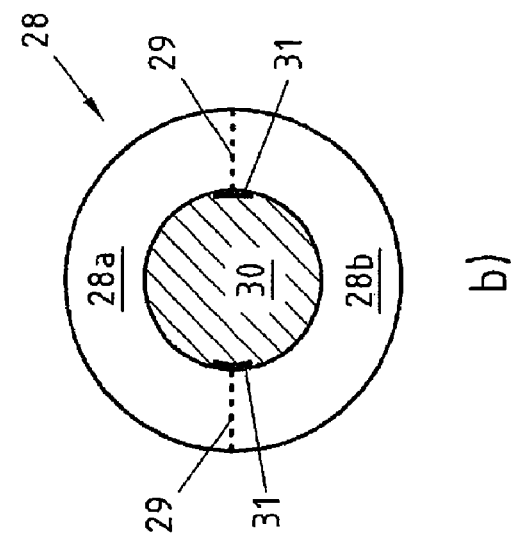

FIG. 4a) is then a schematic axial sectional view, as a fourth exemplary embodiment of the invention, of a closed hollow profile which is produced in accordance with the invention and consists of low-springback half shells. FIG. 4b) is a plan view of the same closed hollow profile 28. The hollow profile 28 consists of two half shells 28a and 28b which are produced using the method according to the invention and joined together via a weld seam 29. Preferably, the hollow profiles are welded in contour dies (not shown) which are for this purpose positioned relative to one another in such a way that the edges of the half shells 28a and 28b form a butt joint. The weld seam 29 can preferably be produced using a laser beam, wherein particularly precise positioning of the butt joint being required. As described hereinbefore, it is possible in particularly low-springback half shells 28a, 28b to use merely simple positioning pins (also not shown) as positioning means for positioning the half shells. Furthermore, alternative welding methods are also conceivable for welding the half shells 28a and 28b to each other.

FIG. 4b) additionally shows, in the plan view of the closed hollow profile 28, the resilient hose 30 which is introduced into the hollow profile to eliminate any restoring forces and is acted on by a pressure medium to compensate for inwardly directed restoring moments. Outwardly, restoring forces are accommodated during the welding, for example by the contour die used for positioning. In the resilient hose, the regions of the weld seam are formed so as to be thermally protected and have for example a ceramic strip 31. For the sake of simplicity, the dies in which the half shells are positioned for welding are not shown in FIG. 4b).

The invention claimed is:

1. Method for producing low-springback half shells made of a metal, in which blanks are drawn in at least one drawing die, such that the blanks have flange regions on a deep drawn body after the deep drawing, wherein the flange regions are shaped by upsetting a corner substantially perpendicularly to a wall of the body of the deep drawn blank, and the flange regions are subsequently trimmed in a shearing die, such that half shells without margins are produced; wherein a reverse curve is introduced into the flange regions prior to the trimming.

2. Method according to claim 1, wherein during and/or after the trimming of the flange regions, the body and/or the edges of the trimmed half shells are additionally upset.

3. Method according to claim 1, wherein the deep drawing of the blank and the shaping of the flange regions takes place in a single operation in the at least one drawing die, the shaping of the flange regions being carried out by a blank holder.

4. Method according to claim 1, wherein an upsetting component is taken into account in the deep drawing of the blank in the at least one drawing die.

5. Method according to claim 1, wherein the flange regions are trimmed by punching or using a laser beam.

6. Method for producing closed hollow profiles comprising positioning at least two half shells in such a way that the edges each form a butt joint and welding the half shells to one another along the edges, wherein the at least two half shells are made of a metal, in which blanks are drawn in at least one drawing die, such that the blanks have flange regions on a deep drawn body after the deep drawing, wherein the flange regions are shaped by upsetting a corner substantially perpendicularly to a wall of the body of the deep drawn blank, and the flange regions are subsequently trimmed in a shearing die, such that the at least two half shells without margins are produced.

7. Method according to claim 6, wherein at least two shearing dies are used to produce the at least two half shells, the at least two half shells are subsequently inserted into two contour dies and the at least two half shells are positioned relative to each other by a form fit of the two contour dies using a suitable device.

8. Method according to claim 6 wherein prior to the welding of the at least two half shells there is inserted between the positioned half shells a resilient hose which is subjected to pressure via a pressure medium and remains between the half shells during the welding.

9. Method according to claim 8, wherein the resilient hose is thermally protected.

* * * * *